(12) United States Patent
Hung

(10) Patent No.: US 9,992,422 B2
(45) Date of Patent: Jun. 5, 2018

(54) MOTION GUIDING METHOD AND MOTION GUIDING APPARATUS

(71) Applicant: MSI Computer(Shenzhen)Co., Ltd., Shenzhen (CN)

(72) Inventor: Shih-Che Hung, New Taipei (TW)

(73) Assignee: MSI Computer (Shenzhen) Co., Ltd., Shenzhen (CN)

( * ) Notice: Subject to any disclaimer, the term of this patent is extended or adjusted under 35 U.S.C. 154(b) by 156 days.

(21) Appl. No.: 14/742,206

(22) Filed: Jun. 17, 2015

(65) Prior Publication Data
US 2016/0221194 A1 Aug. 4, 2016

(30) Foreign Application Priority Data
Jan. 30, 2015 (TW) .............................. 104103350 A

(51) Int. Cl.
G06K 9/00 (2006.01)
H04N 5/232 (2006.01)
G05D 1/02 (2006.01)

(52) U.S. Cl.
CPC ....... H04N 5/23296 (2013.01); G05D 1/0234 (2013.01); G05D 2201/0203 (2013.01); Y10S 901/01 (2013.01); Y10S 901/09 (2013.01)

(58) Field of Classification Search
CPC ........... G06K 7/10732; G06K 7/10594; G06K 7/10722; G06K 7/10564; G06K 7/10574; G06K 7/10702; G06K 7/10801; G06T 7/521; G06F 3/0425
See application file for complete search history.

(56) References Cited

U.S. PATENT DOCUMENTS

| 6,278,917 | B1 | 8/2001 | Bauer et al. |
| 2002/0120364 | A1* | 8/2002 | Colens ................ A47L 11/4005 700/262 |
| 2005/0010330 | A1* | 1/2005 | Abramson ........... G05D 1/0225 700/245 |
| 2005/0156562 | A1* | 7/2005 | Cohen ................... A47L 9/2857 320/107 |
| 2005/0231156 | A1* | 10/2005 | Yan ...................... G05D 1/0225 320/107 |
| 2006/0178815 | A1* | 8/2006 | Choi .................... G05D 1/0225 701/495 |

(Continued)

FOREIGN PATENT DOCUMENTS

CN 1768683 9/2012

*Primary Examiner* — Vu Le
*Assistant Examiner* — Guillermo Rivera-Martinez

(57) ABSTRACT

A motion guiding apparatus includes a guiding device and a mobile unit. The guiding device includes a main body, an arm piece, and a linear light source. The main body is in connection with the arm piece and arranged on a reference surface. The linear light source is arranged on the arm piece and forms a reference light line on the reference surface and a direct light line on the main body. The mobile unit is capable of capturing an image showing the reference light beam, the direct light beam, and a reflected light line. The mobile unit can also compute an angle formed between the reference light line and the reflected light line to obtain a relative angle between the mobile unit and the linear light source, so as to move in accordance to the relative angle. A motion guiding method is also provided.

12 Claims, 10 Drawing Sheets

(56) References Cited

U.S. PATENT DOCUMENTS

| | | | |
|---|---|---|---|
| 2010/0228421 A1* | 9/2010 | DiBernardo | G01S 5/163 701/28 |
| 2012/0296511 A1* | 11/2012 | More | G05D 1/0225 701/26 |
| 2013/0214726 A1* | 8/2013 | Teng | G05D 1/0234 320/107 |

* cited by examiner

MOTION GUIDING METHOD AND MOTION GUIDING APPARATUS

CROSS-REFERENCES TO RELATED APPLICATIONS

This non-provisional application claims priority under 35 U.S.C. § 119(a) on Patent Application No. 104103350 filed in Taiwan, R.O.C. on Jan. 30, 2015, the entire contents of which are hereby incorporated by reference.

BACKGROUND

Technical Field

The instant disclosure relates to a space measuring method, in particular, to a motion guiding method and a motion guiding apparatus using the same.

Related Art

With the advancement in technology, robots are widely used in today's modern day life, for example, robotic arms, security robots, broom-sweeping robots, etc. Robots can perform precise operations, repeat routine tasks, and help humans with basic chores such as broom-sweeping robots. One type of broom-sweeping robots is self-propelled robot vacuum cleaner applicable for home cleaning. When people are sleeping at night or out for work during the day, the robot vacuum cleaner can move about the house and clean up dusts, particles, etc. Hence, the residents are saved from cleaning the house room-by-room tediously.

Once the active robots have completed its tasks, the robots are normally required to return to electrical charging stations for recharging. Therefore, how to allow these robots to locate charging stations efficiently and move toward target locations are important issues to consider.

SUMMARY

In light of above, the instant disclosure provides a motion guiding method and a motion guiding device using the same. Thereby, a mobile unit (e.g., a robot) may be easily informed of its location within a surrounding and control its movement.

The motion guiding method includes the steps of: disposing a linear light source at a distance above a reference surface, where the linear light source may yield light in a piecewise continuous or discontinuous manner; using the linear light source to produce a reference light line on the reference surface and a direct light line on an outer surface, with one edge of the outer surface being adjacent to the reference surface; capturing an image by an image-capturing module with the image showing the reference light line, direct light line, and a reflected light, wherein the reflected light line is a reflection of the direct light line on the reference surface; computing a reference angle formed between the reference and reflected light lines to obtain a relative angle between the image-capturing module and the linear light source; moving the image-capturing module based on the obtained relative angle.

The motion guiding method further comprises the step of: computing a time difference or phase difference between the direct and reflected light lines, in order to obtain a relative distance between the image-capturing module and the linear light source. Thereby, the mobile unit may move according to the obtained relative angle and distance.

In one embodiment, the motion guiding method may further include the step of: computing the movement speed of the image-capturing module based on the relative distances obtained in order.

In another embodiment, the motion guiding method may further include the step of: computing the angular velocity of the image capturing module based on the relative angles obtained in order.

Based on the above method, by solely relying on the captured image of the light emitted from the linear light source, analysis can be done to determine the distance, angle, speed, and/or angular velocity of the image-capturing module relative to the linear light source. Based on these parameters, the mobile unit may move accordingly relative to the linear light source.

In yet another embodiment, the instant disclosure provides a motion guiding apparatus. The apparatus comprises a guiding device and a mobile unit. The guiding device includes a main body, an arm piece, and the linear light source. The mobile unit includes a moving module, the image-capturing module, and a computing module.

The main body has a first and a second end portions. The first end portion is in contact with the reference surface. The arm piece is joined to the second end portion of the main body. The linear light source is disposed on a side face of the arm piece, with the side face directed toward the reference surface. The linear light source emits light to produce the reference light line on the reference surface, in addition to produce the direct light line on an outer surface of the main body, with one edge of the outer surface being adjacent to the reference surface. The image obtained by the image-capturing module shows the reference light line, direct light line, and reflected light line. The computing module is connected to the moving module and the image-capturing module. The interconnection allows the computing module to obtain the captured image and compute the reference angle formed between the reference light line and the reflected light line. Thereby, the relative angle between the mobile unit and the linear light source can be obtained. Based on this relative angle, the computing module drives the moving module in guiding the mobile unit for motion.

The computing module may further compute the time or phase difference between the direct and reflected light lines, in order to obtain the relative distance between the mobile unit and the linear light source. As with the relative angle, the computing module utilizes the relative distance to drive the moving module in guiding the mobile unit for motion.

In one embodiment, the main body may further have a step-like reflective portion. The reflective portion is formed protrudingly from the first end portion of the main body, such that some of the light emitted from the linear light source is reflected to form at least one first light diffusing zone. Since the illumination intensity within the first light diffusing zone is non-uniform, the computing module can determine the location of the mobile unit within the first light diffusing zone, based on the light illumination extracted from the captured image.

In another embodiment, some of the emitted light is reflected by the reference surface in forming a second light diffusing zone. For the second light-diffusing zone, the average illumination intensity is less than that of the first light-diffusing zone. Thereby, the computing module can determine if the mobile unit is located within the first or second light diffusing zone, based on the illumination intensity extracted from the captured image.

In yet another embodiment, when the computing module recognizes the captured image is missing the linear light source, the mobile unit is determined to be facing away from the guiding device. In that case, the computing module can drive the moving module to perform a rotary motion until the linear light source appears in the image, before continuing with operations of image capturing and recognition.

Hence, by solely arranging the guiding device having the linear light source within a surrounding, the mobile unit can determine its position relative to the guiding device and moves with respect thereto.

DETAILED DESCRIPTION

Figure 1:
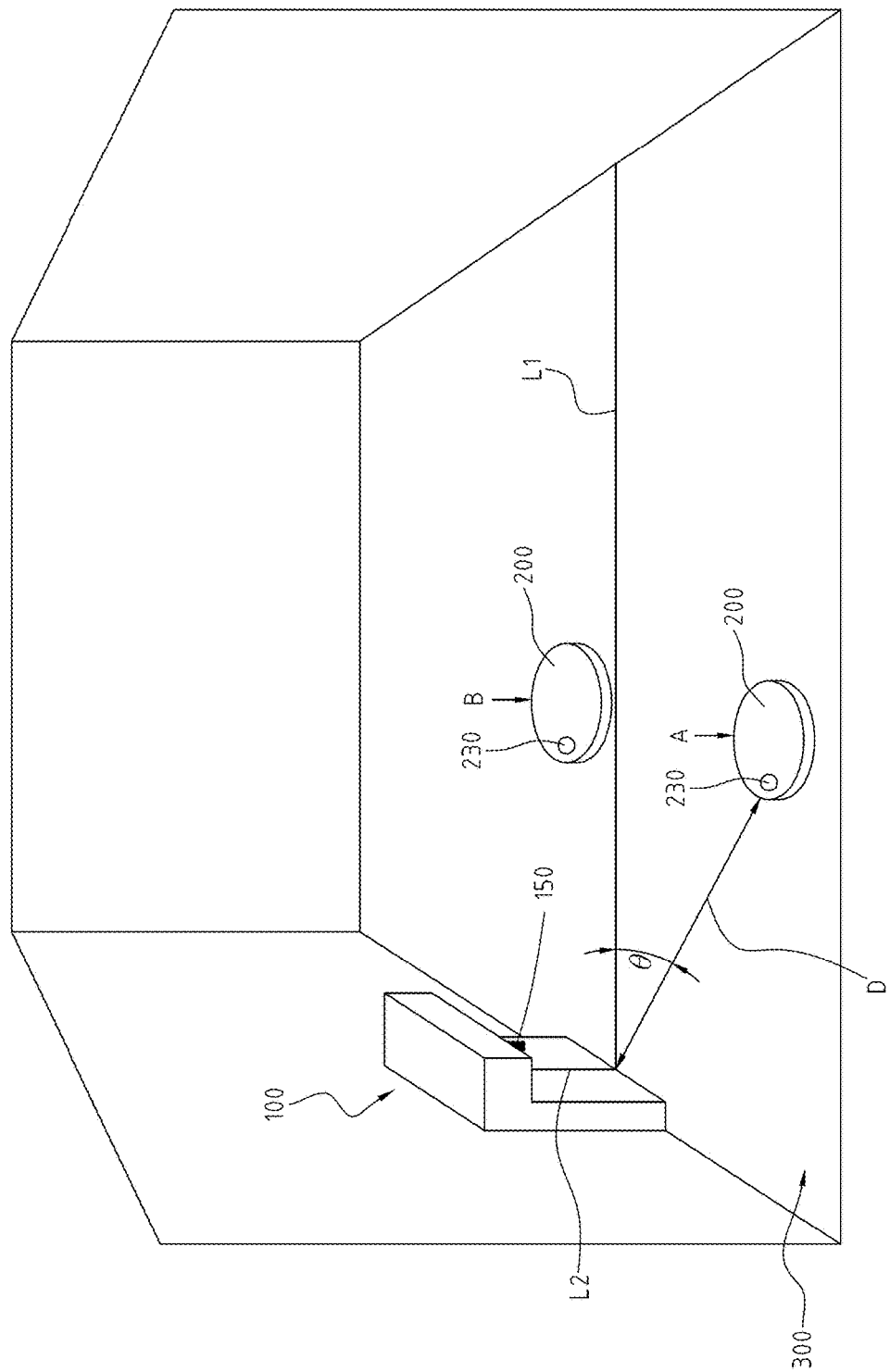
FIG. 1 is a schematic view of a first embodiment for using a motion guiding apparatus of the instant disclosure.

Please refer to FIG. 1, which shows a schematic view of a first embodiment for using a motion guiding apparatus of the instant disclosure. The motion guiding apparatus comprises a guiding device 100 and a mobile unit 200, both arranged on a reference surface 300 within a surrounding such as a living room, a bedroom, and any other interior or exterior space. For the present embodiment, the surrounding environment is an interior space defined by the reference surface 300 and at least three wall surfaces disposed around the periphery thereof. In other embodiments, the reference surface 300 may be a ceiling structure or some other wall-like surface, and the reference surface 300 does not have to be joined to any wall surface.

Figure 2:
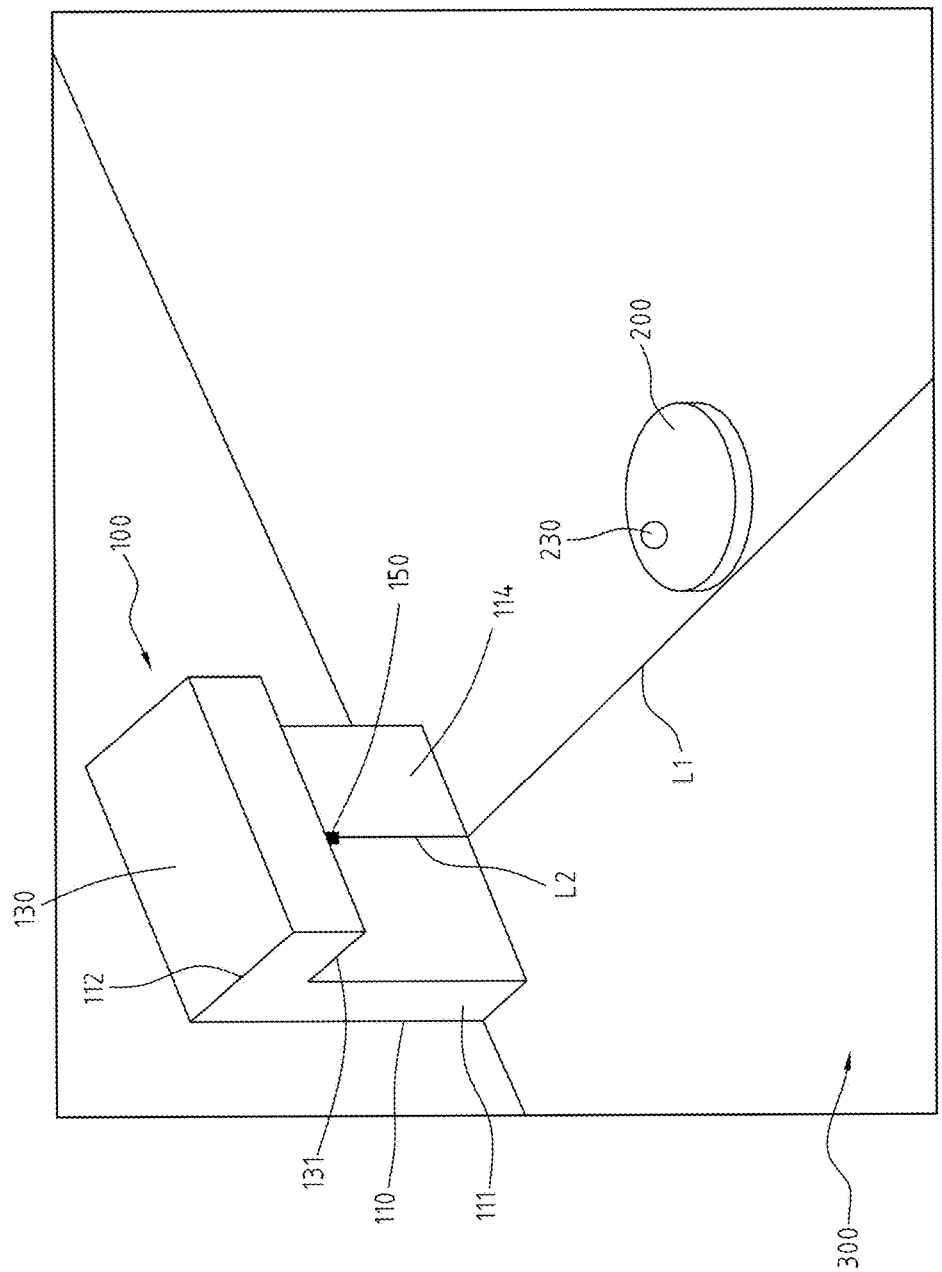
FIG. 2 is a perspective view of a guiding device in FIG. 1.

Please refer to FIG. 2, which is a perspective view showing the guiding device 100 in FIG. 1. The guiding device 100 has a main body 110, an arm piece 130, and a linear light source 150. It should be noted that the linear light source 150 may yield light in a piecewise continuous or discontinuous manner. The main body 100 further has a first end portion 111 and an opposing second end portion 112. The first end portion 111 stands on the reference surface 300, and the arm piece 130 is joined to the second end portion 112. The main body 110 and the arm piece 130 jointly define an L-shaped structure. However, the outer appearance of the guiding device 100 is not limited thereto.

The linear light source 150 is disposed on a side face 131 of the arm piece 130, with the side face 131 directed toward the reference surface 300. For the present configuration, the side face 131 represents the bottom surface of the arm piece 130. The linear light source 150 emits light away from the side face 131 (i.e., toward the reference surface 300), such that a reference light line L1 is produced on the reference surface 300. Thus, the reference surface 300 may be divided into two halves by the reference light line L1 (as shown in FIG. 1). Back to FIG. 2, a direct light line L2 may be produced on an outer surface 114 of the main body 110 by the linear light source 150. The outer surface 114 is adjacent to the reference surface 300 perpendicularly. The light emitted by the linear light source 150 may be either visible or non-visible.

Figure 3:
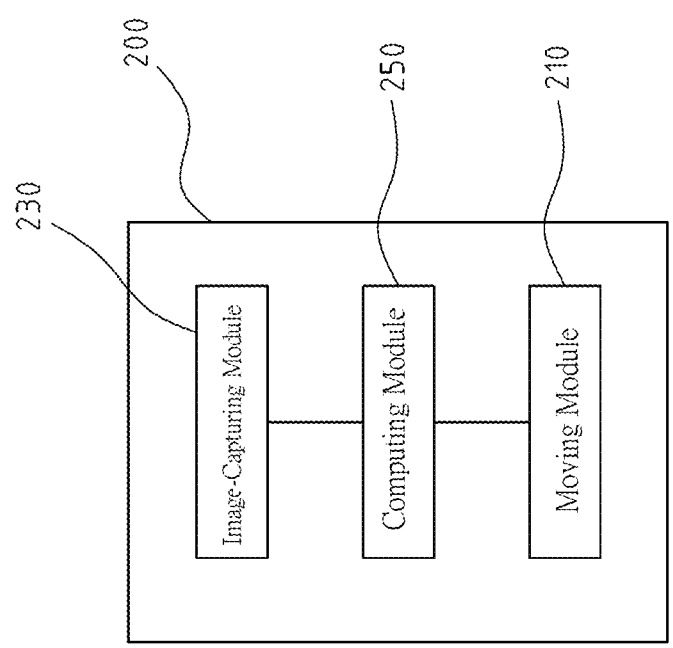
FIG. 3 is a functional block diagram of a mobile unit for the first embodiment of the instant disclosure.

Referring to FIG. 3, which illustrates a functional block diagram of the mobile unit 200. The mobile unit 200 includes a moving module 210, an image-capturing module 230, and a computing module 250. The computing module 250 is connected with the moving module 210 and the image-capturing module 230. The computing module 250 may include a processor and a memory unit for data computation and storage. The moving module 210 may include a roller unit and a motor for moving the mobile unit 200. The image-capturing module 230 may include a lens, a light-sensitive element, and an image processor working cooperatively for image capturing. The lens is disposed externally of the mobile unit 200 for capturing images of the surrounding. The mobile unit 200 may be a dust cleaning robot, a lawn mowing robot, or some other self-guiding mechanism. Depending on the application, the mobile unit 200 may include other functional modules (e.g., vacuuming module) without limitation.

Figure 4:
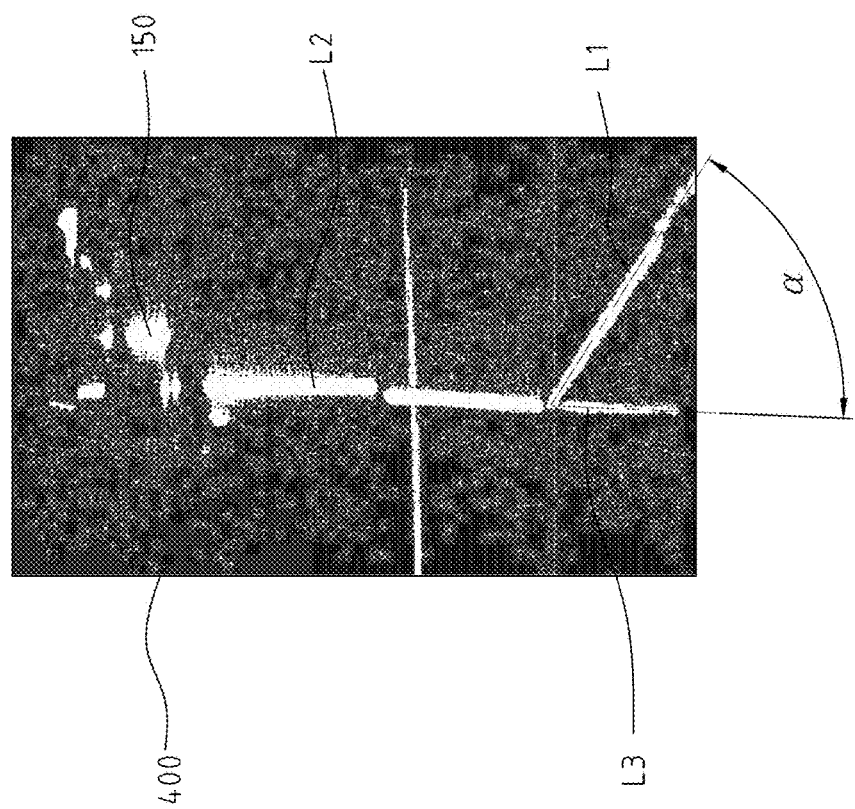
FIG. 4 is a captured image for the first embodiment of the instant disclosure.
Figure 5:
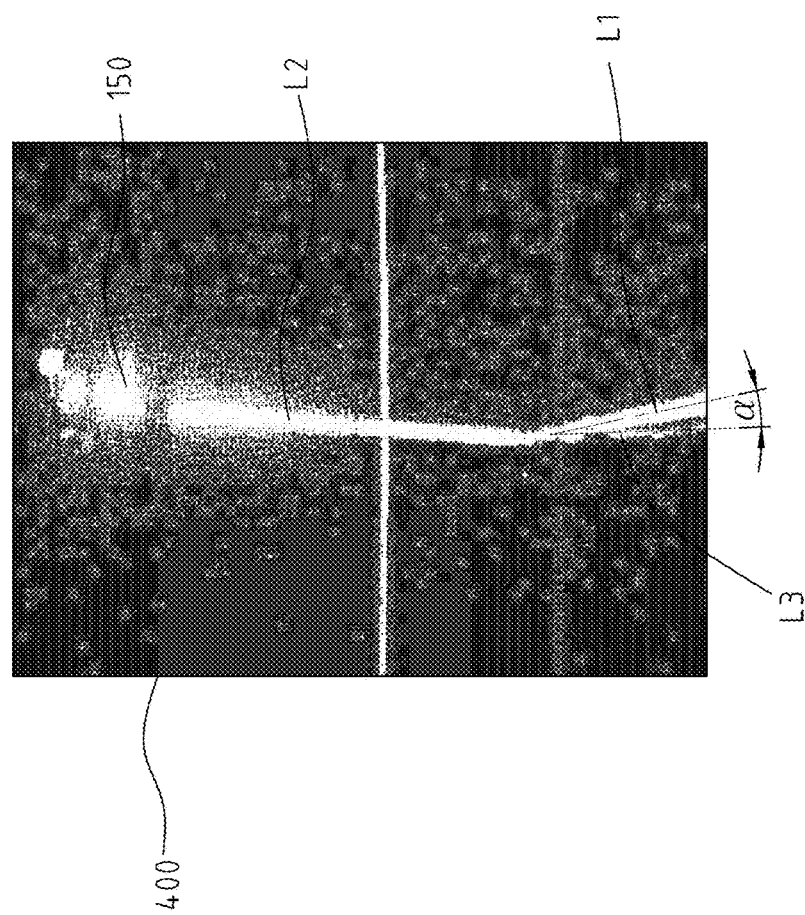
FIG. 5 is another captured image for the first embodiment of the instant disclosure.

FIGS. 4 and 5 illustrate images 400 obtained by the image-capturing module 230. In conjunction with FIG. 1, the image 400 in FIG. 4 is captured while the mobile unit 200 is located at position A (off one side of the reference light line L1). The image 400 shows the reference light line L1, direct light line L2, and a reflected light line L3. The reflected light line L3 is produced by the reflection of the direct light line L2 on the reference surface 300. If the computing module 250 could not identify the linear light source 150 within the image 400, the linear light source 150 is determined to be beyond the range limit of the image-capturing module 230 (e.g., facing away from the linear light source 150). In that scenario, the computing module 250 will drive the moving module 210 to perform a rotary motion until the linear light source 150 appears in the image 400.

Referring to FIG. 5 in conjunction with FIG. 1, the obtained image 400 is for the mobile unit 200 located at position B. In comparing to FIG. 4, the reference angle α formed between the reference and reflected light lines L1 and L3 in FIG. 5 is smaller. The magnitude of the reference angle α is directly proportional to the relative angle θ formed between the mobile unit 200 (or the image-capturing module 230) and the linear light source 150 (or the guiding device 100). As the relative angle θ increases, the reference angle α increases as well. When the relative angle θ is decreased, the reference angle α will also decrease. Therefore, after the image 400 has been obtained, the computing module 250 can compute the reference angle α between the reference and reflected light lines L1 and L3, to obtain the relative angle θ between the mobile unit 200 and the linear light source 150. Then, the computing module 250 may drive the moving module 210 to move in a manner according to the relative angle θ. For example, the computing module 250 may drive the moving module 210 to move toward or away from the guiding device 100 based on the relative angle θ. Thus, by utilizing a single linear light source 150, the instant disclosure allows the mobile unit 200 to know its relative position within a surrounding and determine how to move about therewithin. Furthermore, whether the linear light source 150 is emitting light in a piecewise continuous or discontinuous manner, the linear light source 150 does not need to change its light-outputting frequency, angle, etc., which makes it easy to operate and cost-effective.

In practice, a charging station for the mobile unit 200 may be furnished with previously mentioned guiding device 100. By this way, the mobile unit 200 may move toward the charging station for recharging.

In addition, the reference light line L1 may act as a warning line of light. When the mobile unit 200 has detected that it is approaching the reference light line L1, the mobile unit 200 may move away from the reference light line L1 to avoid trespassing.

The computing module 250 is also capable of computing a time or phase difference between the direct light line L2 and the reflected light line L3. The difference is applicable toward obtaining a relative distance D between the mobile unit 200 (or the image-capturing module 230) and the linear light source 150. Based on the relative distance D and the relative angle θ, the computing module 250 can drive the moving module 210 to move accordingly.

Figure 6:
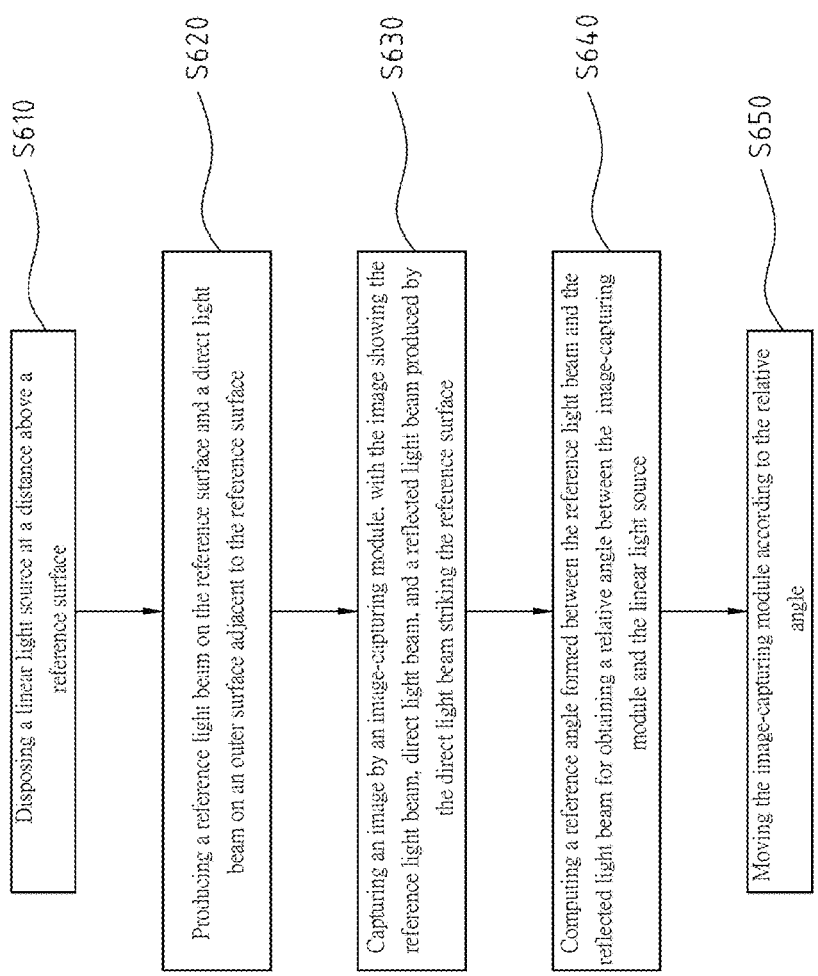
FIG. 6 is a flow chart of a motion guiding method for the first embodiment of the instant disclosure.

Referring to FIG. 6, which shows a flow chart of the motion-guiding method of the instant disclosure. First, for step S610, the linear light source 150 is disposed at a distance above the reference surface 300. This can be done by the previously mentioned guiding element 100. Next, in step S620, the linear light source 150 is turned on, with the emitted light producing the reference light line L1 on the reference surface 300 and the direct light line L2 on the outer surface 114 adjacent to the reference surface 300. Then, for step S630, the image-capturing module 230 captures the image 400, which shows the reference light line L1, direct light line L2, and reflected light line L3. Based on the image 400, for step S640, the reference angle α and relative θ are computed. In the following step S650, the image-capturing module 230 is moved according to the relative angle θ.

After the relative distance D and/or relative angle θ is obtained, the computing module 250 can further compute the speed of the moving mobile unit 200 (or the image-capturing module 230), based on the relative distances D obtained in order. Similarly, the angular velocity of the mobile unit 200 (or the image-capturing module 230) may be computed based on the relative angles θ obtained in order. Thereby, in accordance to the parameters such as the relative distance D, relative angle θ, movement speed, and angular velocity, the location and movement status of the mobile unit 200 can be known, and suitable adjustments for its movement can be made if necessary.

Figure 7:
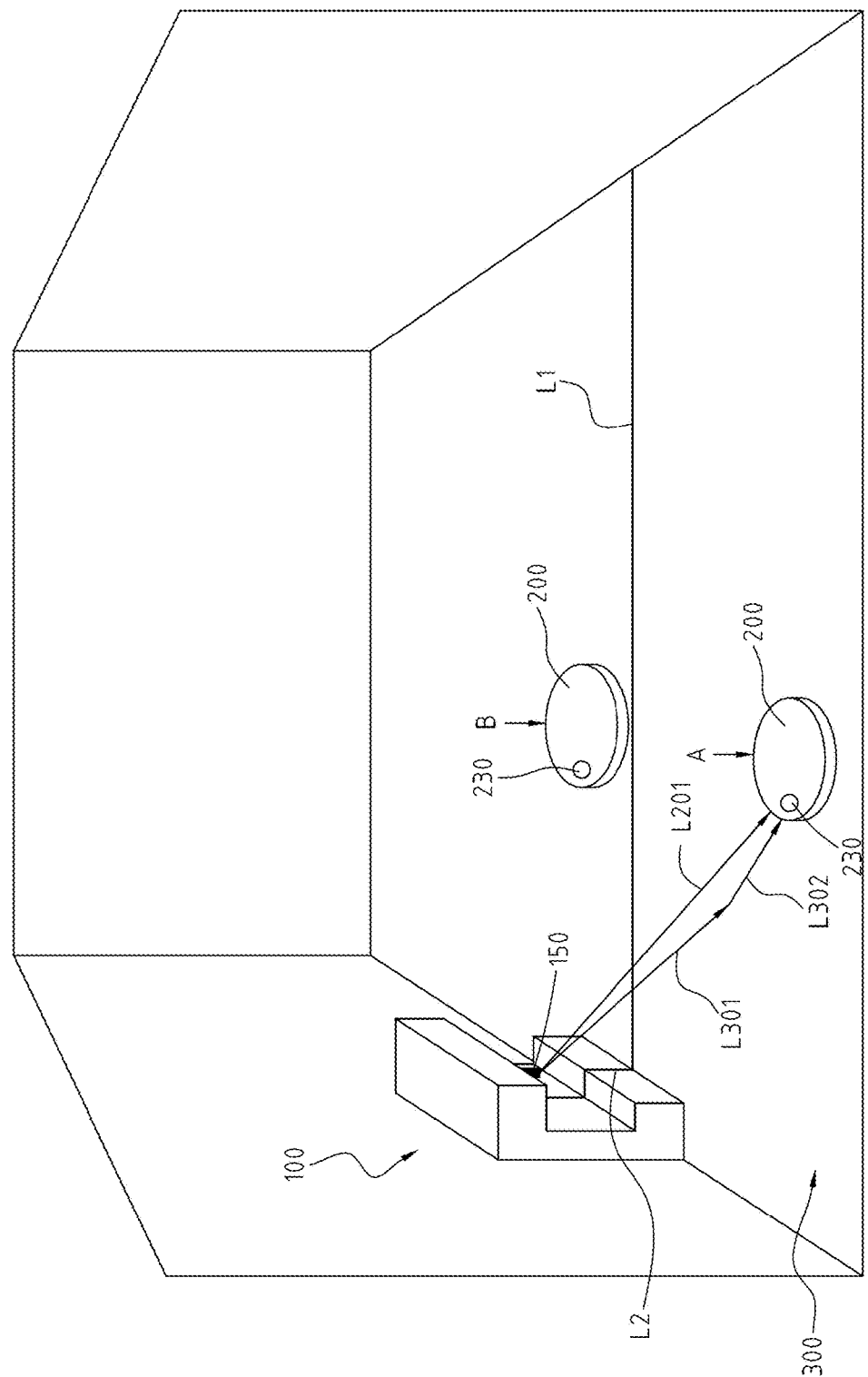
FIG. 7 is a schematic view of a second embodiment for using the motion guiding apparatus of the instant disclosure.
Figure 8:
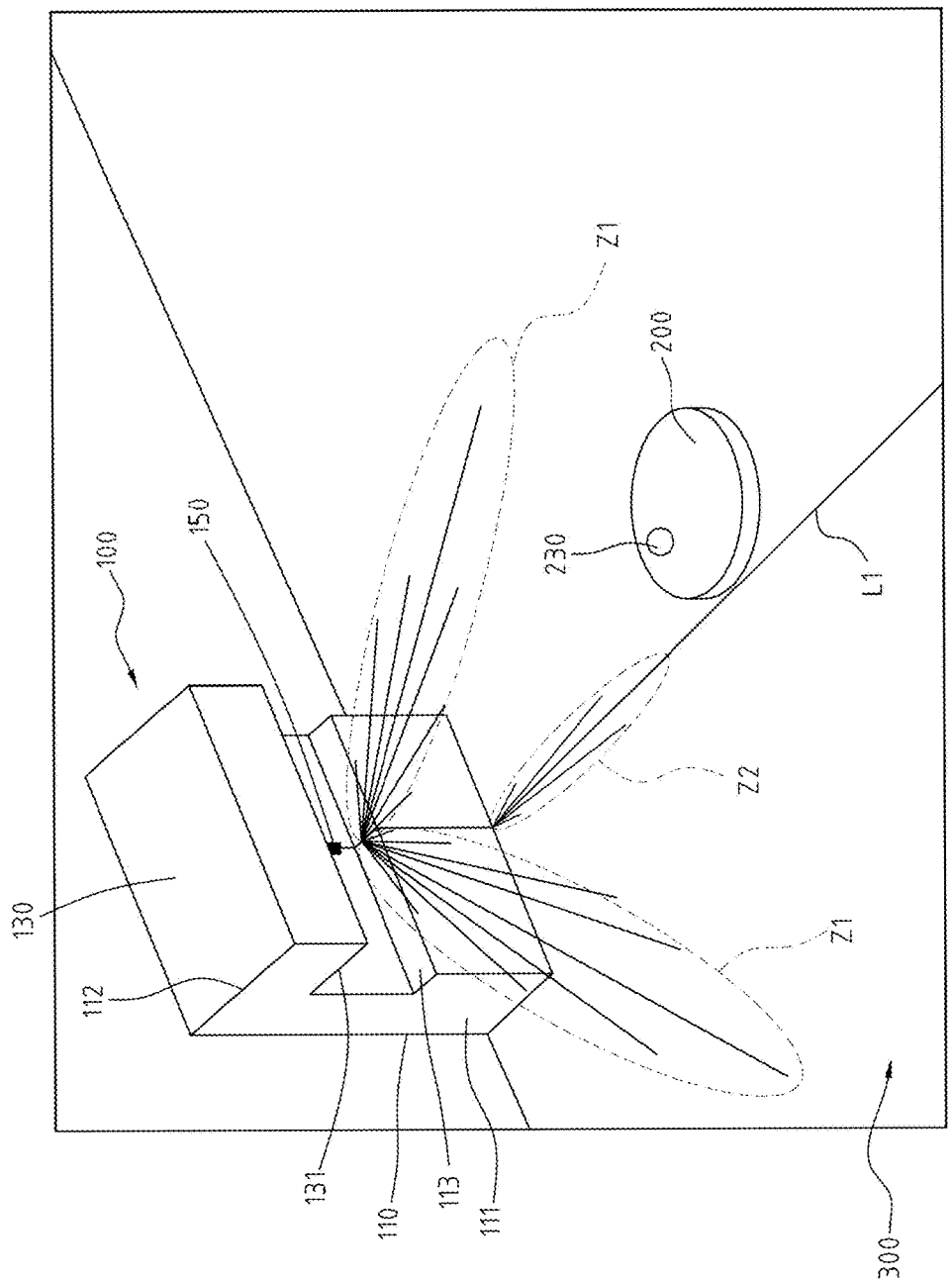
FIG. 8 is a perspective view of the guiding device in FIG. 7.

With reference to FIG. 7, there is shown a second embodiment of the instant disclosure, and the corresponding guiding device 100 is shown in FIG. 8. Please refer to both figures for the description hereinafter. In comparing to the previous embodiment, the difference being for the second embodiment, the main body 110 of the guiding device 100 further has a step-like reflective portion 113. The reflective portion 113 protrudes away from the first end portion 111 of the main body 110. In this manner, some of the light emitted by the linear light source 150 is reflected by the reflective portion 113 to produce at least one first light diffusing zone Z1. For the present embodiment, although the reflective portion 113 is extended orthogonally from the main body 110, but is not limited thereto. That is, the angle formed between the reflective portion 113 and the main body 110 is not restricted to be 90 degrees. In addition, for the reflective portion 113, the length (long side) of its reflective surface (i.e., top surface) that actually reflects the emitted light does not have to be identical with that of the main body 110. The reflective surface only needs to be long enough to reflect the emitted light. For the present embodiment, a pair of reflectors (not shown) is oppositely disposed on the reflective surface of the reflective portion 113, so that some of the light emitted by the linear light source 150 incidents to the reflectors and results in a pair of first light diffusing zones Z1 on opposite sides of the reference light line L1. Each of the first light diffusing zones Z1 is oriented at an angle of approximately 45 degrees relative to the reference light line L1, but is not limited thereto. As depicted in FIG. 8, the illumination intensity is not uniform within each first light diffusing zone Z1 (the length of each straight line indicates the level of intensity, with longer lines for higher intensity). Another feature is that the illumination intensity is distributed symmetrically. That is, the level of intensity is greater near the middle region and decreases further away therefrom within each diffusing zone. Please note the preceding configuration of the diffusing zones is only for explanatory purpose, and it not restricted thereto. If the reflective surface of the reflective portion 113 takes on a different shape or the reflectors are arranged and shaped differently, the distribution of illumination intensity for the diffusing zones will be altered as well. The exact configuration can be adjusted in accordance to the surrounding environment and design preferences. Since the illumination intensity within each first light diffusing zone Z1 is non-uniform, the computing module 250 is capable of determining the location of the mobile unit 200 within either one of the first light diffusing zones Z1, based on the illumination intensity extracted from the captured image 400.

Similar to the previously described first light diffusing zones Z1, a second light diffusing zone Z2 is formed as some of the light emitted by the linear light source 150 strikes the reference surface 300. Since the distance from the reference surface 300 to the linear light source 150 is greater than that from the reflective portion 113, the average illumination intensity of the second light diffusing zone Z2 is less than that of the first light diffusing zones Z1. Thus, based on the illumination intensity extracted from the captured image 400, the computing module 250 can distinguish if the extracted illumination intensity belongs to the first light diffusing zone Z1 or the second light diffusing zone Z2, thereby determining if the mobile unit 200 is located within the first diffusing zone Z1 or the second light diffusing zone Z2. Furthermore, the width (i.e., the short side) of the reflective surface for the reflective portion 113 affects the illumination intensity of the first light diffusion zones Z1. For example with a longer width, the illumination intensity is greater. On the other hand, the illumination intensity is weaker with a shorter width.

Please refer back to FIG. 7, and the imaging principle of the direct light line L2 and reflected light line L3 are described in detail hereinbelow. In conjunction with FIG. 4, when the mobile unit 200 is located at position A, the captured image 400 shows the direct and reflected lines L2 and L3. For the linear light source 150, the point of light emission is also imaged via the direct and reflected light lines L2 and L3. For the direct light line L2, the point of emission can be traced through a path L201 from the image-capturing module 230. As for the reflected light line L3, the point of emission can be traced through two paths L301 and L302, with L302 being the path that the reflected light line L3 travels from the reference surface 300 to the image-capturing module 230.

Figure 9:
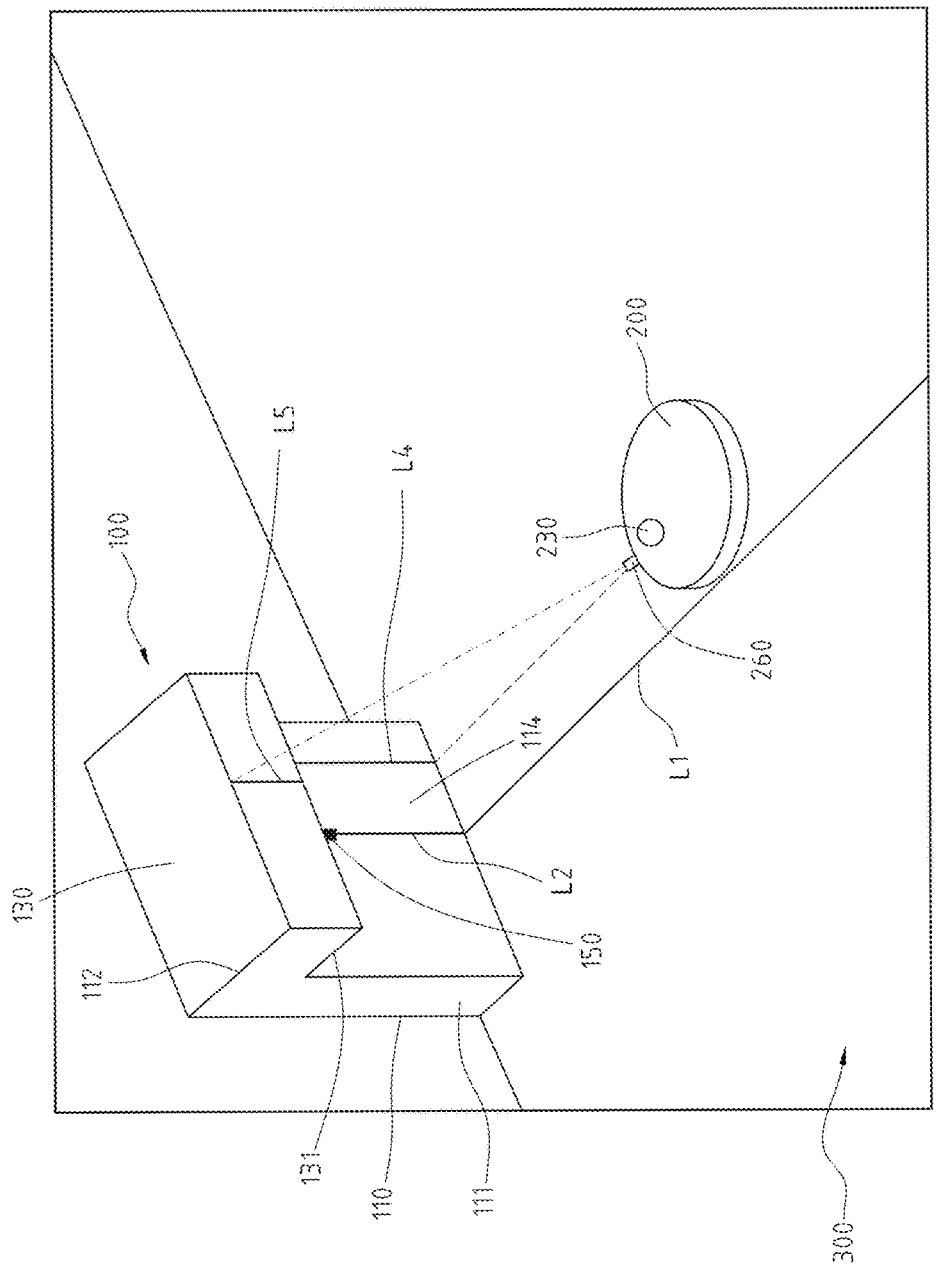
FIG. 9 is a schematic view of the mobile unit emitting light according to a first embodiment of the instant disclosure.
Figure 10:
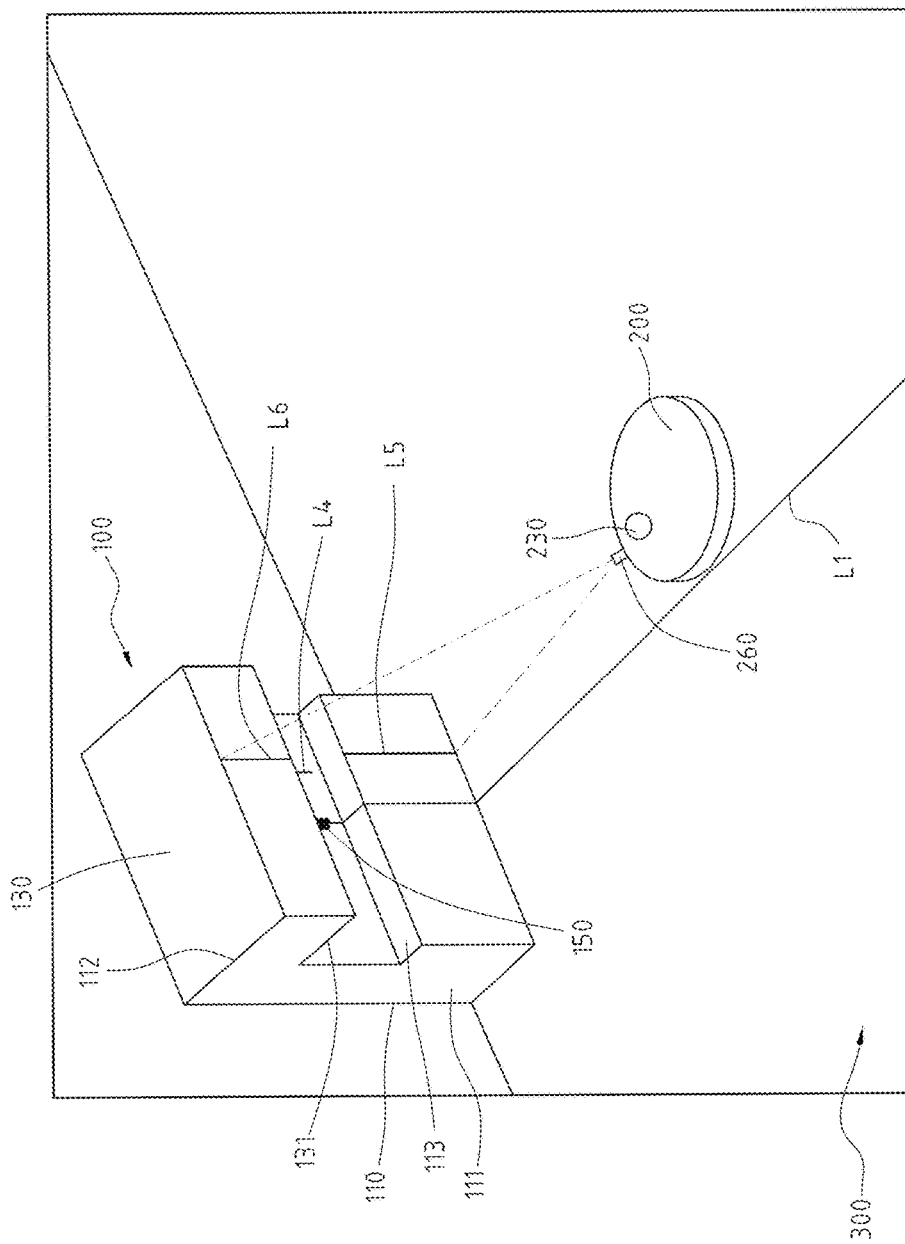
FIG. 10 is a schematic view of the mobile unit emitting light according to a second embodiment of the instant disclosure.

In some embodiments, the mobile unit 200 itself can include a mobile linear light source 260. Here, like the linear light source 150, the mobile linear light source 260 is capable of emitting light in a piecewise continuous or discontinuous manner. This mobile linear light source 260 enables the mobile unit 200 to project light onto at least two different surfaces of the guiding device 100. For example, the mobile linear light source 260 can project light onto at least two of the following: main body 110; arm piece 130; and reflective portion 113. As depicted in FIG. 9, a portion of the light projected by the mobile linear light source 260 forms a first light line L4 on the main body 110, while another portion forms a second light line L5 on the arm piece 130. Another scenario is illustrated in FIG. 10, where a portion of the light projected by the mobile linear light source 260 forms the first light line L4 on the main body 110, another portion of the light forms the second light line L5 on the reflective portion 113, and yet another portion of the light falls on the arm piece 130 as a third light line L6. Therefore, different surfaces of the guiding device 100 are projected with different light lines. Based on the above, the computing module 250 of the mobile unit 200 can analyze the image of different light lines taken by the image-capturing module 230. For example, the "deviation" between the first and second light lines L4 and L5 can be used to calculate the angle formed by the mobile unit 200 relative to the guiding device 100. The "deviation" can be the offset distance between parallel light lines, the axial distance between the leading and trailing light lines, the angle formed between the light lines, or a combination thereof.

Based on the above, for the motion guiding method and apparatus of the instant disclosure, the mobile unit 200 can be guided for motion by simply relying on the guiding device 100 alone.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A motion guiding method, comprising:
   disposing a linear light source on a reference surface-facing side face of an arm piece of a main body at a distance above a reference surface, the main body being in contact with the reference surface;
   projecting, by the linear light source, a reference light line on the reference surface and a direct light line on an outer surface of the main body, wherein one edge of the outer surface of the main body is adjacent to the reference surface;
   capturing an image by an image-capturing module, with the image showing the reference light line, the direct light line, and a reflected light line, wherein the reflected light line is a reflection of the direct light line on generated by the direct light line striking the reference surface;
   computing a reference angle formed between the reference light line and the reflected light line shown in the image to obtain a relative angle between the image-capturing module and the linear light source; and
   moving the image-capturing module based on the relative angle.

2. The motion guiding method of claim 1, further comprising:
   computing a time or phase difference between the direct light line and the reflected light line to obtain a relative distance between the image-capturing module and the linear light source.

3. The motion guiding method of claim 2, further comprising:
   computing the speed of the moving image-capturing module based on the relative distances obtained in order.

4. The motion guiding method of claim 1, further comprising:
   computing the angular speed of the moving image-capturing module based on the relative angles obtained in order.

5. A motion guiding apparatus, comprising:
   a guiding device comprising:
      a main body having a first end portion and a second end portion, the first end portion being in contact with a reference surface;
      an arm piece extending from the second end portion; and
      a linear light source disposed on a reference surface-facing side face of the arm piece, the light emitted by the linear light source projecting a reference light line on the reference surface and a direct light line on an outer surface of the main body with one edge of the outer surface being adjacent to the reference surface; and
   a mobile unit comprising:
      a moving module including a roller and a motor;
      an image-capturing module including a lens, a light-sensitive element and an image processor, for capturing an image of the reference light line, the direct light line, and a reflected light line, wherein the reflected light line is a reflection of the direct light line on the reference surface; and
      a computing module connected to the moving module and the image-capturing module, including a processor for computing a reference angle formed between the reference light line and the reflected light line shown in the image, so as to obtain a relative angle between the mobile unit and the linear light source such that the computing module drives the moving module to move based on the relative angle.

6. The motion guiding apparatus of claim 5, wherein the computing module computes a time or phase difference between the direct light line and the reflected light line to obtain a relative distance between the mobile unit and the linear light source, so as to guide the mobile unit for motion by the computing module based on the relative angle and the relative distance.

7. The motion guiding apparatus of claim 5, wherein the main body has a reflective portion, which protrudes away from the first end portion of the main body such that some of the light emitted by the linear light source is reflected by the reflective portion for establishing at least one first light diffusing zone having non-uniform illumination intensity, and wherein based on the illumination intensity extracted from the image, the computing module is capable of calculating the location of the mobile unit within the first light diffusing zone.

8. The motion guiding apparatus of claim 7, wherein some of the light emitted by the linear light source is reflected by the reference surface to establish a second light diffusing zone having an average illumination intensity less than that of the first light diffusing zones, and wherein based on the illumination intensity extracted from the captured image, the computing module is capable of distinguishing if the extracted illumination intensity belongs to the first light diffusing zone or the second light diffusing zone, thereby determining if the mobile unit is located within the first light diffusing zone or the second light diffusing zone.

9. The motion guiding apparatus of claim 5, wherein when the computing module has determined the captured image is not showing the linear light source, the computing module initiates the mobile unit to conduct a rotary motion until the linear light source appears in the image.

10. The motion guiding apparatus of claim 5, wherein the mobile unit further includes a mobile linear light source, wherein the mobile linear light source is capable of projecting light to the main body and the arm piece so as to form a first light line on the main body and a second light line on the arm piece, and wherein according to the obtained image the computing module calculates the deviation between the first and second light lines to obtain the angle formed by the mobile unit relative to the guiding device.

11. The motion guiding apparatus of claim 5, wherein the main body has a reflective portion that protrudes away from the first end portion of the main body, wherein the mobile unit further includes a mobile linear light source, with the mobile linear light source capable of projecting light to at least two of the following: the main body; the arm piece; and the reflective portion so as to form a first light line and a second light line, and wherein according to the obtained image the computing module calculates the deviation between the first and second light lines to obtain the angle formed by the mobile unit relative to the guiding device.

12. The motion guiding apparatus of claim 5, wherein the mobile unit further includes a mobile linear light source, with the mobile linear light source capable of projecting light to two different surfaces so as to form a first light line and a second light line, and wherein according to the obtained image the computing module calculates the deviation between the first and second light lines to obtain the angle formed by the mobile unit relative to the guiding device.

* * * * *